Figures 1, 2, 3:
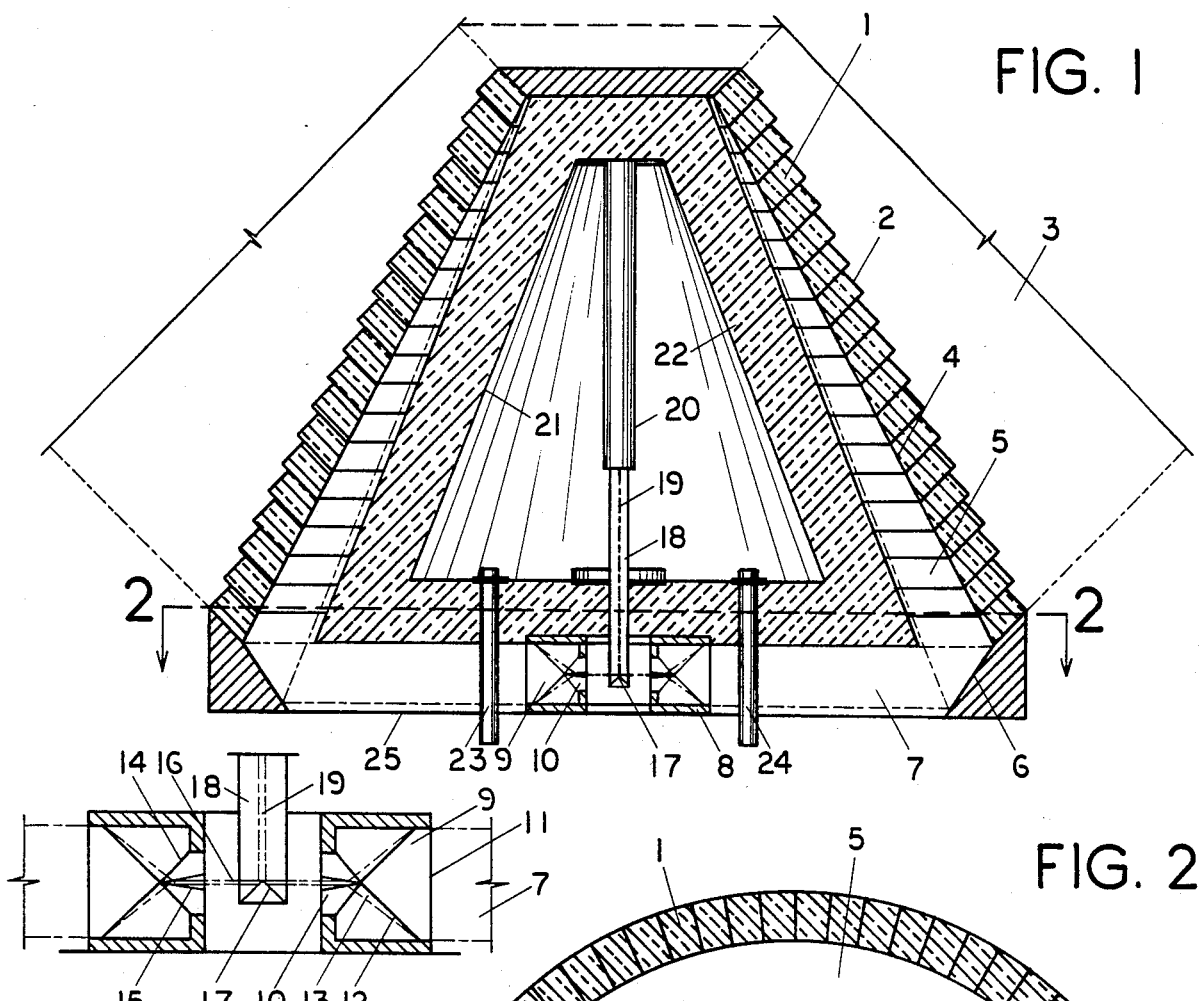

United States Patent [19]

Clegg

[11] Patent Number: 4,602,617
[45] Date of Patent: Jul. 29, 1986

[54] SOLAR HOT-WATER HEATER

[76] Inventor: John E. Clegg, 2320 Keystone Dr., Orlando, Fla. 32806

[21] Appl. No.: 767,396

[22] Filed: Aug. 20, 1985

[51] Int. Cl.$^4$ ............................................. F24J 2/08
[52] U.S. Cl. .................................... 126/440; 126/438; 126/437; 126/450
[58] Field of Search ............... 126/440, 450, 439, 417, 126/437, 451

[56] References Cited

U.S. PATENT DOCUMENTS

| | | | |
|---|---|---|---|
| 2,259,902 | 10/1941 | McCain | 126/440 |
| 4,068,474 | 1/1978 | Dimitroff | 126/451 X |
| 4,086,911 | 5/1978 | Futch | 126/437 X |
| 4,136,674 | 1/1979 | Korr | 126/439 |
| 4,333,713 | 6/1982 | Clegg | 126/440 X |

FOREIGN PATENT DOCUMENTS 2801674 7/1979 Fed. Rep. of Germany ...... 126/439

Primary Examiner—Larry Jones
Assistant Examiner—Carl D. Price

[57] ABSTRACT

A passive system for heating water by a concentrated beam of diffused solar radiation. A convergent conical incipient beam of diffused sunlight with a cross-sectional area of 15,700 cm$^2$ is reduced in size to a concentrated circular whole beam with a cross-sectional area of 2.25 cm$^2$. The reduction in beam size is achieved by three conical lenses which concentrate the beam by refraction and by an annular conical mirror which reflects the beam inward to the vertical axis and concentrates the beam by convergence. The concentrated beam is projected into a hot-water tank onto a metal heating element which absorbs the heat of the beam and transfers the heat to the water.

1 Claim, 3 Drawing Figures

U.S. Patent   Jul. 29, 1986   4,602,617

SOLAR HOT-WATER HEATER

BACKGROUND

The code designation of the heater is L-2RT-L-RT:C (L—reflecting section of a mirror, R—refracting section of a component lens, T—transmitting section of a component lens, and C—concentrating stage lens). A beam passing through the heater is transmitted and refracted (RT), reflected (L), transmitted and refracted twice more (2RT), and reflected again (L).

Prior art includes two inventions featuring containers of heat-absorbing liquid (water) which is heated by absorption of direct solar radiation, as follows;

1. Solar Radiation Unit, U.S. Pat. No. 4,116,223, Sept. 26, 1978, by Vasilantone. A hemispheric glass dome concentrates direct sunlight into a water reservoir in which domestic water circulates through a coil.
2. Stable Density Stratification Solar Pond, U.S. Pat. No. 4,512,332, Apr. 23, 1985, by Lansing. Direct solar radiation is absorbed by a body of water to which dye has been added to render the water opaque to the transmission of light. The heat is transferred to domestic water circulating through a coil submerged in the opaque water.

Concurrent art includes the Conical Diffused-Sunlight Solar Panel, Ser. No. 762,896, filed Aug. 6, 1985, by this inventor. This panel has a convex conical lens which is similar to the lens of the Solar Hot-Water Heater. The lens of the panel is mounted in a horizontal position so as to emit a concentrated beam in the horizontal plane, whereas the lens of the hot-water heater is inclined 28° from vertical so as to emit a concentrated divergent conical beam.

Concurrent art includes also the Circular Conical Beam Concentrator 2RT:C, Ser. No. 654,297, filed Sept. 25, 1984, now abandoned, by this inventor. This concentrator is identical to the one featured in the Solar Hot-Water Heater. The concentrators have an outer annular component lens with a cylindrical section which receives a convergent lateral beam and an inner component lens with two concave conical sections which emit a concentrated convergent lateral beam.

SUMMARY

The use of diffused sunlight as a source of solar energy is a new concept that originated with this inventor. Relatively large convergent conical incipient beams (15,700 $cm^2$ in the present instance) are reduced in size to small concentrated beams (2.25 $cm^2$) which serve as dependable sources of heat throughout the daylight hours regardless of the position of the sun in the sky. The diffused-sunlight panels and heaters are fully operational even on cloudy days, though the heat output is much reduced when the sky is obscured by low overcast cloud formations and by fog, rain or snow.

DRAWINGS

FIG. 1 is an elevation of the solar hot-water heater.
FIG. 2 is a cross section taken on line 2—2.
FIG. 3 is an elevation of the central circular conical beam concentrator and vertical glass rod of the heater.

DESCRIPTION

The solar hot-water heater is designed for mounting on the roof of a building (house) and in other elevated or ground-level locations which are fully exposed to the sky. The diffused sunlight on which the heater depends for heat strikes the lens at an angle of 45° from horizontal, and this angle limits the proximity of the heater to buildings, trees and other obstructions of light from the sky.

FIG. 1 is an elevation of the solar hot-water heater comprising annular frusto-conical beam concentrator 1 having a series of nineteen inset convex conical sections 2 which receive diffused sunlight and having a concave conical section 4 which refracts and emits beam 3, forming concentrated divergent conical beam 5. Beam concentrator 1 forms the outside wall of the hot-water heater.

Annular concave conical mirror 6 reflects beam 5 in toward the vertical axis of the heater, forming concentrated convergent lateral beam 7 parallel to the horizontal plane. Mirror 6 is a frusto-conical section with a reflective outer surface which reflects beam 5 inward.

Circular conical beam concentrator 8 is mounted in the center of the heater and consists of an outer annular component lens 9 and an inner annular component lens 10 which are aligned coaxially to the vertical axis. Beam 7 is received and transmitted by cylindrical section 11 and refracted and emitted by two opposed concave conical sections 12, forming two concentrated convergent conical beams 13.

Beams 13 are received and transmitted by two opposed convex conical sections 14 and refracted and emitted by two opposed concave conical sections 15, forming concentrated convergent lateral beam 16 parallel to the horizontal plane.

Beam 16 is reflected by convex conical mirror 17 in the base of vertical glass rod 18, forming concentrated circular whole beam 19 which is projected upward through the glass rod to cylindrical metal heating element 20 occupying the vertical axis of the hot-water tank 21. Glass rod 18 is a cylindrical solid glass member with a concave conical cavity in the base. The cavity is a rear surface mirror, creating a convex conical reflective section which reflects beam 19 upward through the glass rod. A glass rod is used to prevent the interception of beam 19 by soluble mineral deposits or debris which could accumulate on a horizontal glass window in the bottom of the tank.

Tank 21 has a conical wall parallel to concentrated divergent conical beam 5. The wall, base plate and top plate of the tank are enclosed in thermal insulation 22.

The heat content of diffused sunlight is very low. This means that an extremely large amount of diffused sunlight must be received and reduced in size to produce a small concentrated beam with an intensity high enough to provide sustained heat to the heating element throughout the day. The solar hot-water heater achieves the required results by producing four reductions in beam size as shown in the table below:

| Beam | Incident bm. area - $cm^2$ | Means of reduction | Reduced bm. area - $cm^2$ |
|---|---|---|---|
| Diffused sunlight | 15,700 | Refraction | 2,290 |
| Conv. lat. bm. 7 | 2,290 | Convergence | 620 |
| Conv. lat. bm. 7 | 620 | Refraction | 8.3 |
| Conv. lat. bm. 13 | 8.3 | Refraction | 2.25 |

The dimension 2.25 $cm^2$ is the area of convergent lateral beam 16 at convex conical mirror 17 and of circular whole beam 19 which is reflected up into the tank.

The interior parts of the heater are mounted inside casing 25.

I claim:

1. A solar hot-water heater having a vertical axis and a horizontal plane through a base portion of said hot-water heater and comprising generally an annular frusto-conical beam concentrator, a concave conical mirror, a central circular conical beam concentrator, and a convex conical mirror in a base of a vertical glass rod; the above parts having serving as means of reducing diffused sunlight to a small concentrated beam which delivers heat to a metal heating element inside a hot-water tank, and comprising in particular; an annular frusto-conical beam concentrator comprising a conical lens having a top portion and a bottom portion forming the outside wall of said hot-water heater, said lens having a series of nineteen inset convex conical sections which receive and transmit diffused sunlight, said lens having a concave conical section which refracts and emits said diffused sunlight to form a concentrated diverging beam which is projected downward to the bottom portion of said beam concentrator;

an annular concave conical mirror mounted below said beam concentrator away from the top portion parallel to said horizontal plane so as to intercept and reflect said diverging beam in toward said vertical axis to form a concentrated convergent lateral beam parallel to said horizontal plane;

a circular conical beam concentrator mounted about said vertical axis of said hot-water heater concentric with said concave conical mirror and parallel to said horizontal plane, said circular conical beam concentrator having an outer annular component lens with a cylindrical section which receives and transmits said convergent lateral beam and with two opposed concave conical sections which refract and emit said convergent lateral beam to form two concentrated convergent conical beams; said circular conical beam concentrator having an inner component lens with two opposed convex conical sections which receive and transmit said convergent conical beams and with two opposed concave conical sections which refract and emit said convergent conical beams to form a single concentrated convergent lateral beam parallel to said horizontal plane;

a vertical glass rod mounted on said vertical axis, said glass rod having conical mirror located in the base thereof, said mirror positioned to receive and to reflect said convergent lateral beam upward toward the top of said hot-water heater through said glass rod and to form a concentrated circular whole beam occupying said vertical axis;

a hot-water tank mounted inside said hot-water heater above said circular conical beam concentrator, said hot-water tank having a conical wall spaces apart from said annular frusto-conical beam concentrator, said hot-water tank having a base plate parallel to said horizontal plane, said hot-water tank having means of receiving an upper portion of glass rod into said hot-water tank through said base plate; and a cylindrical metal heating element occupying said vertical axis above said glass rod inside hot-water tank and disposed so as to intercept said concentrated circular whole beam and absorb the heat thereof.

* * * * *